United States Patent [19]
Sicre

[11] 4,376,980
[45] Mar. 15, 1983

[54] VARIOMETER

[75] Inventor: Jean L. Sicre, Fontenay aux Roses, France

[73] Assignee: S.F.E.N.A., Velizy Villacoublay, France

[21] Appl. No.: 185,917

[22] PCT Filed: May 14, 1979

[86] PCT No.: PCT/FR79/00043
§ 371 Date: Jan. 15, 1980
§ 102(e) Date: Jan. 15, 1980

[87] PCT Pub. No.: WO79/01079
PCT Pub. Date: Dec. 13, 1979

[30] Foreign Application Priority Data
May 17, 1978 [FR] France .................. 77 14294

[51] Int. Cl.³ .............. G01P 3/62; G06G 7/78; G08B 21/00
[52] U.S. Cl. .................. 364/565; 73/179
[58] Field of Search ........... 364/565, 433, 434; 73/179; 244/180, 182; 318/580

[56] References Cited
U.S. PATENT DOCUMENTS
| | | | |
|---|---|---|---|
| 3,196,691 | 7/1965 | Escobosa | 73/179 |
| 3,264,876 | 8/1966 | Bosch et al. | 73/179 |
| 3,296,422 | 1/1967 | Rusler, Jr. | 364/565 |
| 3,964,307 | 6/1976 | Huhne | 73/179 |

FOREIGN PATENT DOCUMENTS
| | | | |
|---|---|---|---|
| 2820871 | 11/1978 | Fed. Rep. of Germany | 73/179 |
| 995625 | 6/1965 | United Kingdom . | |

*Primary Examiner*—Joseph F. Ruggiero
*Assistant Examiner*—Gary Chin
*Attorney, Agent, or Firm*—Scully, Scott, Murphy & Presser

[57] ABSTRACT

This invention concerns an improved variometer which is used in aircraft which operates on a circuit that calculates the instantaneous speed hx° of the aircraft and the potential vertical speed of the aircraft $h_x^{*°}$. A luminous display is also provided to display the values so calculated to alert the pilot of the aircraft.

The instantaneous vertical speed $h_x^{*°}$ is obtained by means of a circuit solving the equation:

$$h_x^{*°} = \frac{h°_A}{1 + \tau_1 s} \times \frac{1 + (\tau_1 + \tau_2)}{1 + \tau_2 s} + \frac{\tau_1}{1 + \tau_1 s} \times \frac{\tau_2 s}{1 + \tau_2 s} (j_{z1} - g \cos \phi),$$

in which $j_z$ is the component of the acceleration on the vertical axis of the aircraft, g is the acceleration of gravity, $\phi$ is the angle of roll of the airplane, s is the Laplace operator, $\tau_1$ and $\tau_2$ are constants of time and $h°_A$ is a signal of vertical speed.

3 Claims, 4 Drawing Figures

VARIOMETER

BACKGROUND OF THE INVENTION

1. Field of the Invention

The present invention concerns an improved variometer, of a type similar to the one shown in U.S. Ser. No. 113,829 the disclosure of which is incorporated by reference herein.

2. Discussion of the Prior Art

One recalls that the variometer according to the abovementioned application or principal patent comprises essentially a dial including in a standard way a scale representative of a vertical speed, a needle indicating on the said scale the instantaneous vertical speed of the aircraft, an indicator representative of the potential vertical speed, which is moveable around the dial and whose position in relation to the needle indicates instantaneously the acceleration on the trajectory of the aircraft, and can also include an indication by a digital display of the gradient of the airplane.

In such a variometer, the signal representative of the instantaneous vertical speed is obtained by means of a calculation member producing the equation $$h\overset{*\circ}{x} = \frac{h^\circ_A}{1 + \tau_1 s} \times \frac{1 + (\tau_1 + \tau_2)s}{1 + \tau_2 s} + \frac{\tau_1}{1 + \tau_1 s} \times \frac{\tau_2}{1 + \tau_2 s}(j_z - g),$$

equation in which
- $h\overset{*\circ}{x}$ is the signal of the instantaneous vertical speed of the aircraft;
- $h^\circ_A$ is a signal of the vertical speed coming from a central anemometric unit;
- $\tau_1$ is a time constant;
- $\tau_2$ is a time constant;
- s is the Laplace operator;
- $J_z$ is the component of acceleration on the vertical axis which can be provided by an inertial guidance unit.

Moreover, the signal representative of the potential vertical speed $h^\circ_T$ of the aircraft is obtained in carrying out by means of a calculation member of an equation in the form:

$$h^\circ_T = h\overset{*\circ}{x} + \frac{1}{g} V_x \cdot \frac{dV}{dt} x,$$

formula in which
- $h\overset{*\circ}{x}$ is the instantaneous vertical speed of the aircraft;
- g is the acceleration of gravity;
- $V_x$ is the ground speed supplied by a central inertial unit.

By reason of the nature of the parameters which it utilizes, and in particular of the ground speed $V_x$ and of the component $J_z$ of the acceleration, the variometer according to the principal patent applies esentially to aircraft equipped with an inertial guidance unit.

SUMMARY OF THE INVENTION

The invention has, therefore, more particularly for its object a variometer whose general principal is similar to thart of the above-mentioned application, but is able to utilize the parameters available on the aircraft not having any inertial guidance units.

In order to achieve this result, according to the invention, the value of the instantaneous vertical speed indicated by the needle of the variometer is obtained by incorporating to the filtered vertical speed, a lead phase which is the function of the acceleration following the vertical axis of the airplane $J_{z1}$, calculated from the vertical accelerartion measured according to the axis connected to the aircraft and of the angle of rolling $\phi$ of the aircraft.

The expression of this instantaneous vertical speed is therefore in the form:

$$h\overset{*\circ}{x} = \frac{h^\circ_A}{1 + \tau_1 s} \times \frac{1 + (\tau_1 + \tau_2)s}{1 + \tau_2 s} + \frac{\tau_1}{1 + \tau_1 s} \times \frac{\tau_2 s}{1 + \tau_2 s}(j_{z1} - g \cos \phi)$$

formula in which:
- $j_{z1}$ is the component of the acceleration on the vertical axis connected to the plane;
- g is the acceleration of gravity;
- $\phi$ is the angle of roll of the airplane.

According to another embodiment of the invention, the potential vertical speed $h^\circ_T$ of the aircraft is furnished from the following formula:

$$h^\circ_T = h\overset{*\circ}{x} + \frac{1}{g} V_H \left(\frac{dV\overset{*}{x}}{dt}\right) \frac{1}{1 + \tau_4 s}$$

in which:
- I: $h\overset{*\circ}{x}$ is the instantaneous vertical speed of the aircraft (which is obtained as previously indicated);
- II: $V_H$ is a composite speed which has for its expression:

$$V_H = \frac{TAS}{1 + \tau'_1 s} \times \frac{1 + (\tau'_1 + \tau'_2)s}{1 + \tau'_2 s} + \frac{\tau'_1}{1 + \tau'_1 s} \times \frac{\tau'_2 s}{1 + \tau'_2 s}(j_{x1} - g \sin \theta)$$

the expression TAS designating the True Air Speed of the aircraft;
- $\tau'_1$ and $\tau'_2$ being constants of time;
- $\theta$ being the longitudinal position of the aircraft;
- $j_{x1}$ being the component of the acceleration on the longitudinal axis of the aircraft;
- s being the Laplace operator;
- III: $dV\overset{*}{x}/dt$ consists of a mixture of the derivative of the true speed of the aircraft and of the longitudinal accelerartion compensated for gravity, the expression $dV\overset{*}{x}/dt$ being of the form:

$$\frac{dV\overset{*}{x}}{dt} = \frac{\tau_3 s}{1 + \tau_3 s}(j_{x1} - g \sin \theta) + \frac{s}{1 + \tau_3 s} TAS,$$

in which $\tau_3$ is a time constant.

An important advantage in the method of determination of the potential vertical speed previously described, consists in that it allows one to obtain, in case of a wind gradient a true readout whatever the airspeed of the aircraft may be, and this, without it being necessary to effect other corrections, as that was the case in the variometer according to the principal patent.

BRIEF DESCRIPTION OF THE DRAWINGS

One embodiment of the invention will be described hereafter, as a non-limiting example, with reference to the accompanying drawings in which.

DESCRIPTION OF THE PREFERRED EMBODIMENTS

Figure 1:
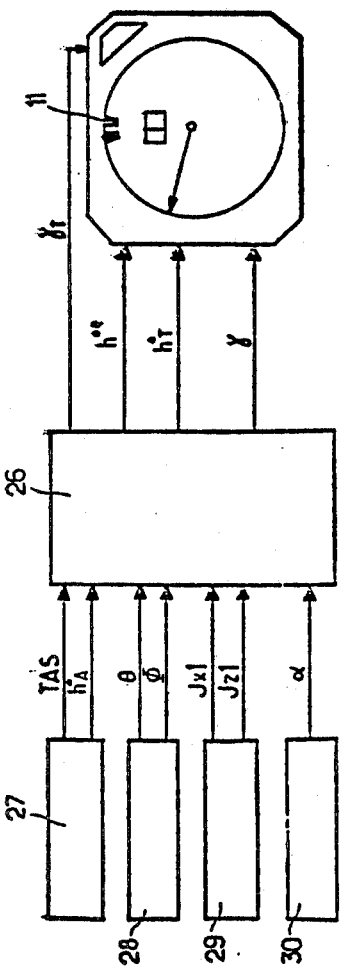
FIG. 1 is a block diagram of the system for calculating the instantaneous vertical speed of the aircraft.

With reference to FIG. 1, the circuit making it possible to obtain the signal of the instantaneous vertical speed of the aircraft and which controls the position of the needle (FIG. 4) of the variometer comprises essentially:

a direct chain or principal circuit wherein the input 1 receives a signal representative of the expression $j_{z1}$ g cos $\phi$, this direct chain comprising an adder 2, an integrator 3 (transfer function 1/s), the output of which supplies the signal $h\overset{*°}{x}$ of instantaneous vertical speed;

a counter-feed-back loop comprising a first subtractor 4 receiving a signal $h\overset{*°}{x}$ and a signal $h°_A$ (input 5) of the vertical speed coming from the central anemometric unit of the aircraft, and whose output is connected, to an integrator 6 (transfer function $1/(\tau_1 \times \tau_2 s)$) and to an amplifier 7 of gain $(\tau_1 + \tau_2)/(\tau_1 \times \tau_2)$, these two members being arranged in parallel and connected, by their output, to the two inputs of an adder 8, the adder 8 being itself connected to the adder 2 upstream of the integrator 3.

Figure 2:
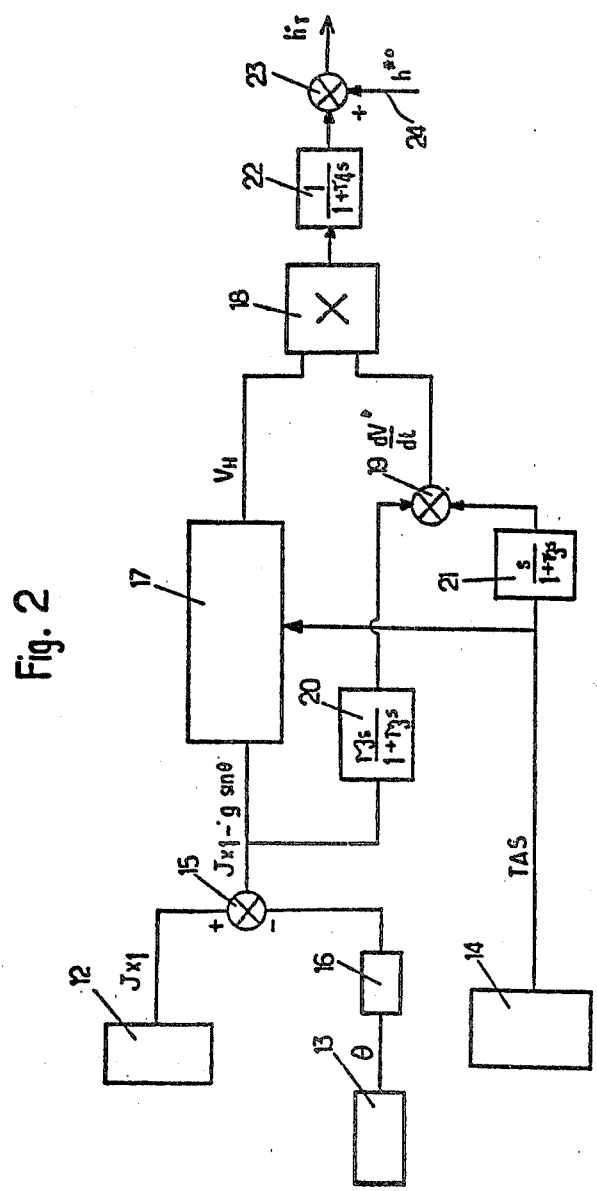
FIG. 2 is a block diagram of the system for calculating the potential vertical speed $h°_T$ of the aircraft.

As regards the signal representative of the potential vertical speed $h°_T$ of the aircraft, starting from which is generated moveable index 11 (FIG. 4) of the variometer, this signal is generated by means of the circuit represented in FIG. 2, wherein:

of a signal representative of the component $j_{x1}$ of the acceleration, supplied by an accelerometer 12;

of a signal representative of the longitudinal position $\theta$, supplied by vertical sensing means 13;

of a signal representative of the true airspeed of the aircraft TAS, emanating from a central anemometrical unit 14;

and of a signal representative of the instantaneous vertical speed $h\overset{*°}{x}$ of the aircraft, provided by a circuit of the type represented in FIG. 1.

The signal issued from accelerometer 12 is transmitted to a subtractor 15, which receives, on another input, a signal $\theta$ supplied by a sine function generator 16, which receives the signal representative of the position $\theta$ furnished by vertical sensing means 13.

The subtractor 15 is interconnected to a complementary filter of the second order 17, which receives equally a signal representative of the true airspeed TAS enamating from the central anemometric unit 14 and which transmits a signal representative of the composite speed $V_H$ such as previously defined to a multiplier 18 and is also connected to an adder 19 through a second filter 20 of transfer function $\tau_3 s/(1+\tau_3 s)$.

The adder 19 receives moreover a signal representative of the derivative in relation to the time of the true speed of the plane, which is furnished by a derivative 21 of the transfer function $s/(1+\tau_3 s)$, connected to the output of the central anemometric unit 14.

It is to be noted that, in order to obtain a correct functioning, the constants of time $\tau_3$ of the derivative 21 and of filter 20 must be identical. The signal $$\frac{dV_x^*}{dt} = \frac{\tau_3 s}{1 + \tau_3 s}(j_{x1} - g \sin \theta) + \frac{s}{1 + \tau_3 s} TAS$$

furnished by the adder 19 is transmitted to the second input of the multiplier 18.

The output of this multiplier 18 is connected, through a second filter 20 of transfer function $1/(1+\tau_4 s)$, to one of the two inputs of a second adder 23, which receives through its second input 24, a signal representative of the instantaneous vertical speed, $h\overset{*°}{x}$, coming from the circuit represented on FIG. 1.

Figure 4:
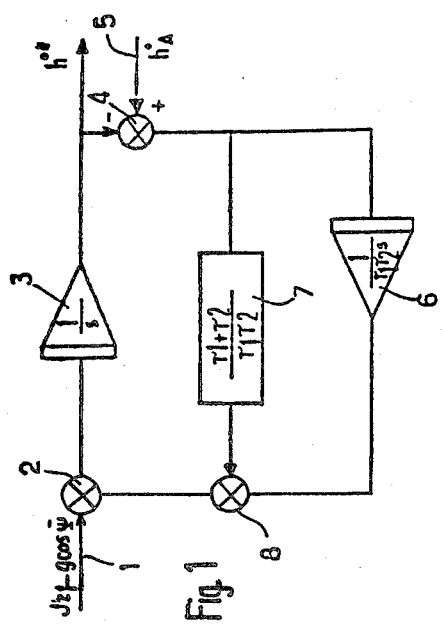
FIG. 4 represents diagrammatically the front face of an improved variometer.

The signal supplied by this second adder 23 is the signal of the potential vertical speed $h°_T$, which makes it possible to generate the indicator 11 of the variometer (FIG. 4).

Figure 3:
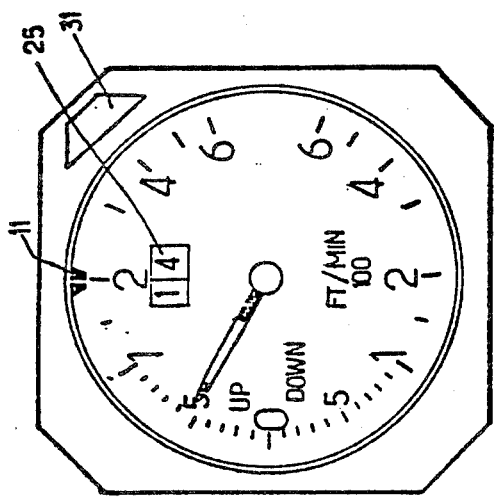
FIG. 3 is a diagrammatic illustration making it possible to illustrate the principle of the system of the improved variometer.

In a general way, the working-out of the signals representative of $h\overset{*°}{x}$, $h°_T$ and of the parameter displayed digitally on the variometer, digital display 25 (FIG. 4), such as the gradient $\gamma_1 = \theta - \alpha$ or the gradient $\gamma_2 = h\overset{*°}{x}/V_H$, which is a pseudo-gradient air/ground, can be effectuated by a calculating member according to the block diagram shown in FIG. 3.

This calculating member can comprise a central unit 26, which receives:

from a central anemometric unit 27, the signals representative of the true air speed TAS and of the vertical speed of the aircraft $h°_A$;

from a vertical sensing means 28, signals representative of the longitudinal position $\theta$ and of the angle of roll $\phi$ of the aircraft;

from accelerometer means 29, the signals $j_{x1}$ and $j_{z1}$ which are components of the acceleration connected to the aircraft;

from an incidence sensing means 30, a signal representative of the incidence $\alpha$ of the aircraft.

It should be noted that from this different data, the central unit can provide information on the total gradient $$\gamma_t = \left(\frac{j_{x1} - j_{z1}\alpha}{g}\right)$$

and on the aerodynamic gradient $\gamma_a = \theta - \alpha$, which information can be used by numerous instruments on board the aircraft, such as the automatic pilot system, flight control horizons, etc.

This central unit can equally be conceived to effect the rapid detection of a gradient of wind, for example in watching over the variations of a magnitude.

$$A = (\gamma_T - \gamma_A) g - \frac{S(TAS)}{1 + 0.25}$$

and delivering a warning signal when this magnitude, possibly combined to the incidence $\alpha$ of the aircraft at the moment when the gradient of wind is produced, rises above the predetermined threshold.

In the case where the aircraft has at its disposal such a system of detection of wind gradients, the invention proposes to utilize as a signal of warning, a luminous signal 31, disposed on the dial of the variometer or in close proximity to the latter, so that, as soon as a gradient of wind is produced, the attention of the pilot is attracted to the variometer, which indicates, notably thanks to the difference between the needle and the indicator 11, the kind of manoeuvering must be made.

What is claimed is:

1. An improved variometer comprising,
   a. a dial entailing in a conventional manner a graduation representative of a vertical speed, a needle indicating on the said graduation, the instantaneous vertical speed $h\overset{*°}{x}$, an indicator representative of the potential vertical speed $h°_T$, a display of the gradient of the aircraft, characterized in that the instantaneous vertical speed $h\overset{*°}{x}$ is obtained by means of a circuit solving the equation:

$$h\overset{*°}{x} = \frac{h°_A}{1 + \tau_1 s} \times \frac{1 + (\tau_1 + \tau_2)s}{1 + \tau_2 s} + \frac{\tau_1}{1 + \tau_2 s}(j_{z1} - g\cos\phi)$$

a formula in which:
   $j_{z1}$ is the component of the acceleration on the vertical axis of the aircraft;
   g is the acceleration of gravity;
   $\phi$ is the angle of roll of the plane;
   s is the Laplace operator;
   $\tau_1$ and $\tau_2$ are constants of time;
   $h°_A$ is a signal of the vertical speed derived from a unit for producing same; and
   b. said circuit making it possible to obtain the instantaneous vertical speed $h\overset{*°}{x}$ comprising;
   a first circuit comprising a first adder whose output is connected to a first integrator and receives a signal representative of the expression ($j_{z1}$ - g cos $\phi$) as its input, the output of said first integrator provides a signal $h\overset{*°}{x}$;
   a counter-feed-back loop comprising a subtractor receiving the signal $h\overset{*°}{x}$ and a signal $h°_A$ as its inputs and whose output is connected, to a second integrator of transfer function $1/(\tau_1 \times \tau_2 s)$ and to an amplifier of gain $(\tau_1 + \tau_2)/(\tau_1 \times \tau_2)$; said second integrator and amplifier being arranged in parallel and their output connected to the two inputs of a second adder whose output is connected to the second input of said first adder.

2. An improved variometer comprising,
   a. a dial involving in a conventional manner, a graduation representative of a vertical speed, a needle indicating on the said graduation, the instantaneous vertical speed $h\overset{*°}{x}$, an indicator representative of the potential vertical speed $h°_T$ and, a display of the gradient of the airplane, characterized in that the potential vertical speed $h°_T$ of the aircraft is obtained from the following formula:

$$h°_T = h\overset{*°}{x} + \frac{1}{g} V_H \frac{dV\overset{*}{x}}{dt} \frac{1}{1 + \tau_4 s}$$

in which:
   I: $h\overset{*°}{x}$ is the instantaneous vertical speed of the aircraft (which is obtained as previously indicated);
   II: $V_H$ is a composite speed which has the expression:

$$V_H = \frac{TAS}{1 + \tau'_1 s} \times \frac{1 + (\tau'_1 + \tau'_2)s}{1 + \tau'_2 s} + \frac{\tau_1}{1 + \tau'_1 s} \times \frac{\tau'_2 s}{1 + \tau_1 s}(j_{x1} - g\sin\theta)$$

the expression TAS designating the true speed of the aircraft, and:
   $\tau'_1$ and $\tau'_2$ being constants of time;
   $\theta$ being the longitudinal position of the aircraft;
   $j_{x1}$ being the component of the acceleration on the longitudinal axis of the aircraft;
   s being the Laplace operator
   III: $dV\overset{*}{x}/dt$ consists in a mixture of the derivative of the true speed of the aircraft and of the compensated longitudinal acceleration of gravity, the expression $dV\overset{*}{x}/dt$ being in the form:

$$\frac{dV\overset{*}{x}}{dt} = \frac{\tau_3 s}{1 + \tau_3 s}(j_{x1} - g\sin\theta) + \frac{s}{1 + \tau_3 s} TAS,$$

in which $\tau_3$ is a constant of time; and
   b. a signal representative of the potential vertical speed $h°_T$ is calculated by means of a circuit in which the signal $j_{x1}$ issued from an accelerometer is transmitted to a first input of subtractor which receives, on its second input, a sine signal $\theta$, the output of the said subtractor being connected, to a first input of a complementary filter of the second order, which receives in its second input a signal representative of the true speed of the aircraft, emanating from a central anemometric unit, the output of this complementary filter being connected to a first input of a multiplier, the output of said subtractor also connected through a first filter to a first input of a first adder which receives moreover a signal representative of the derivative in relation to the time of the true speed of the aircraft at its second input, the output of this first adder being connected to the second input of the multiplier whose output is connected through a second filter, to one of the two inputs of a second adder which receives, in its second input a signal representative of the instantaneous vertical speed $hx°$, and which provides in its output the signal representing the said potential vertical speed $h°_T$.

3. An improved variometer according to either claim 1 or 2, comprising a central unit which monitors and calculates the wind and aircraft gradients, said unit having a maximum wind gradient value stored therein, said unit causing an electronic luminous warning signal to be produced if said calculated wind gradient exceeded said maximum stored value.

* * * * *